March 23, 1948. B. CASTIGLIA 2,438,358
WHEEL GAUGE FOR VEHICLES
Filed April 21, 1943 4 Sheets-Sheet 2
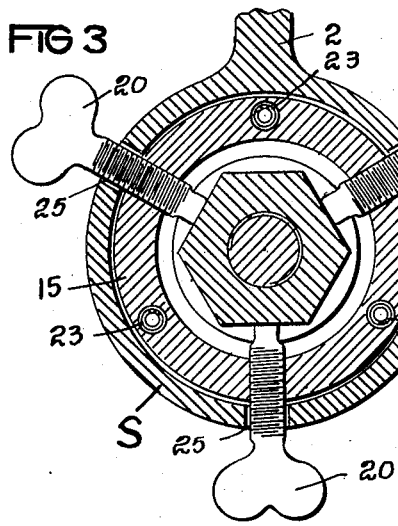
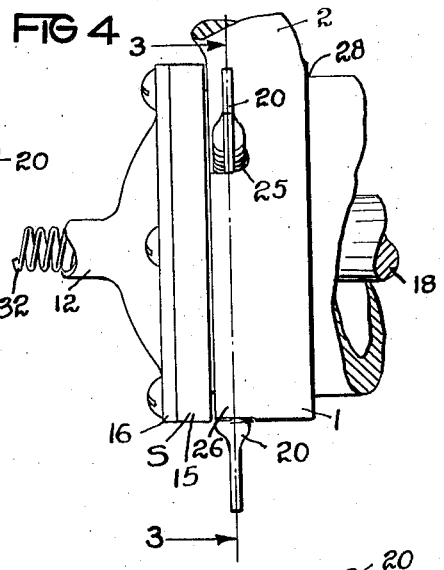
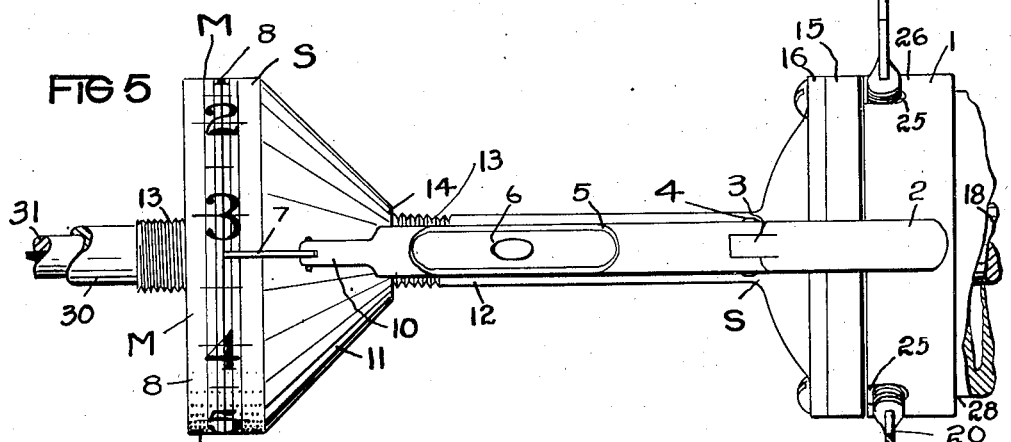
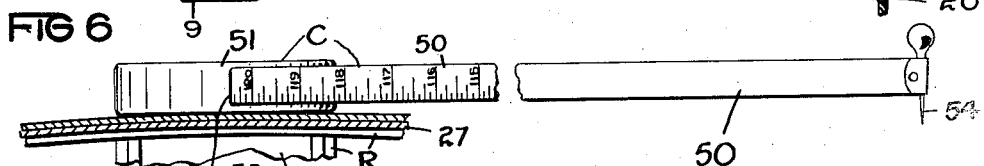
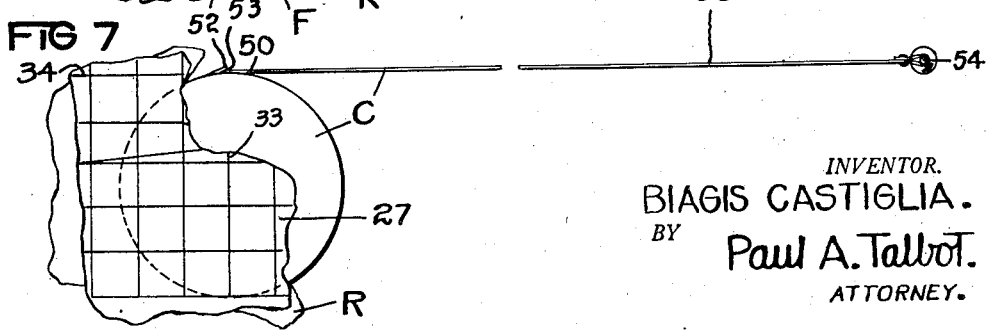
INVENTOR.
BIAGIS CASTIGLIA.
BY Paul A. Talbot.
ATTORNEY.

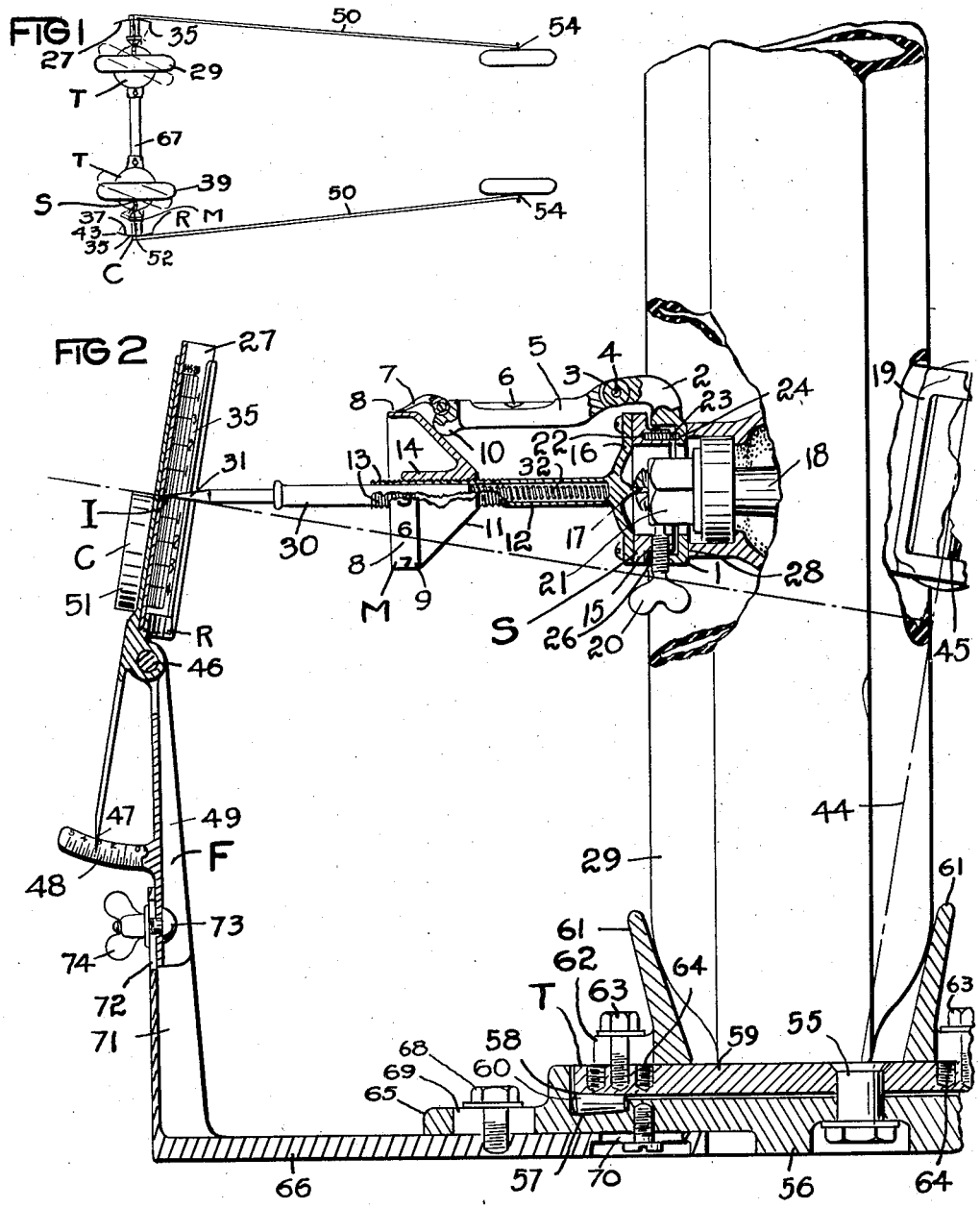

March 23, 1948.　　　B. CASTIGLIA　　　2,438,358
WHEEL GAUGE FOR VEHICLES
Filed April 21, 1943　　　4 Sheets-Sheet 3
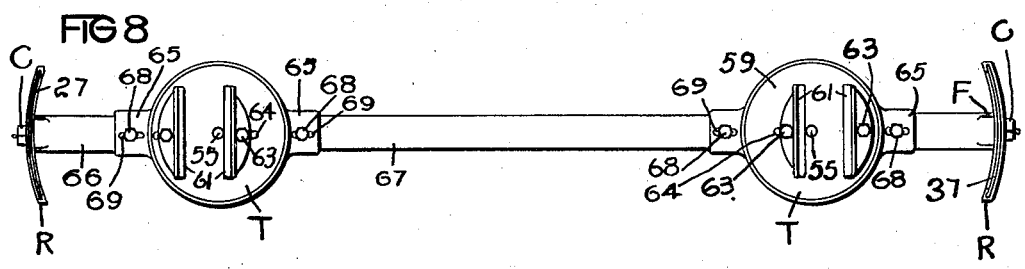
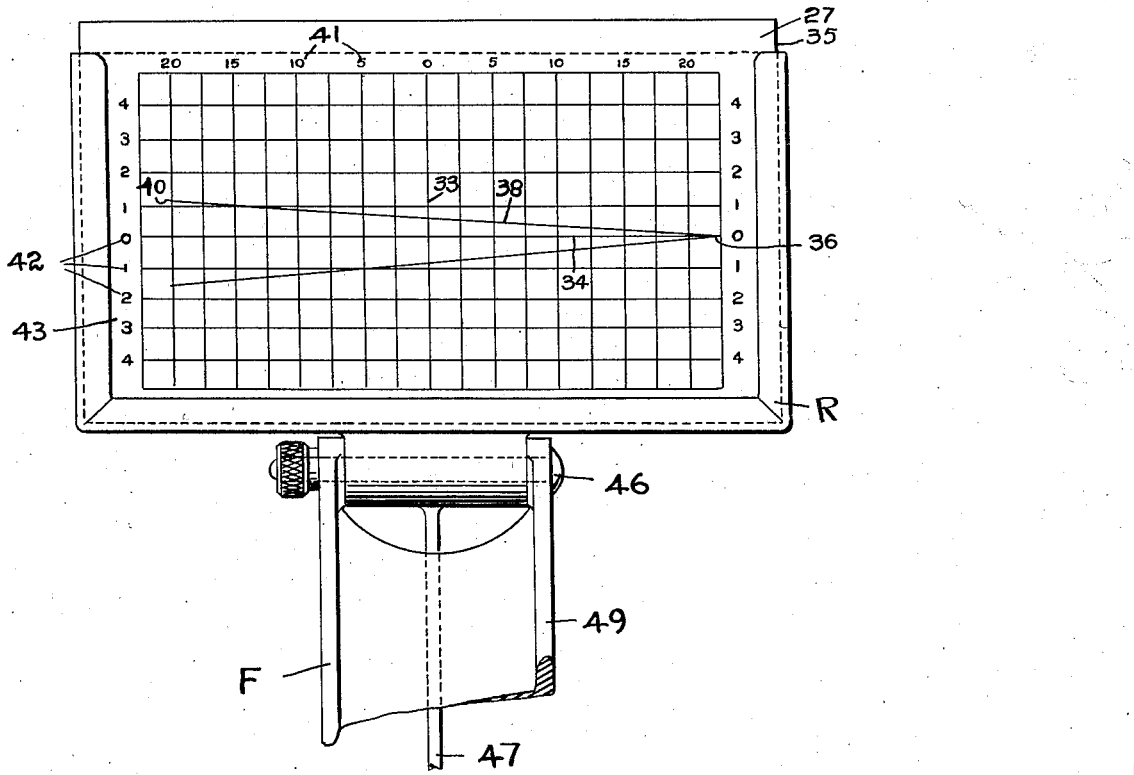
INVENTOR.
BIAGIS CASTIGLIA.
BY
Paul A. Talbot.
ATTORNEY.

March 23, 1948.  B. CASTIGLIA  2,438,358
WHEEL GAUGE FOR VEHICLES
Filed April 21, 1943  4 Sheets-Sheet 4
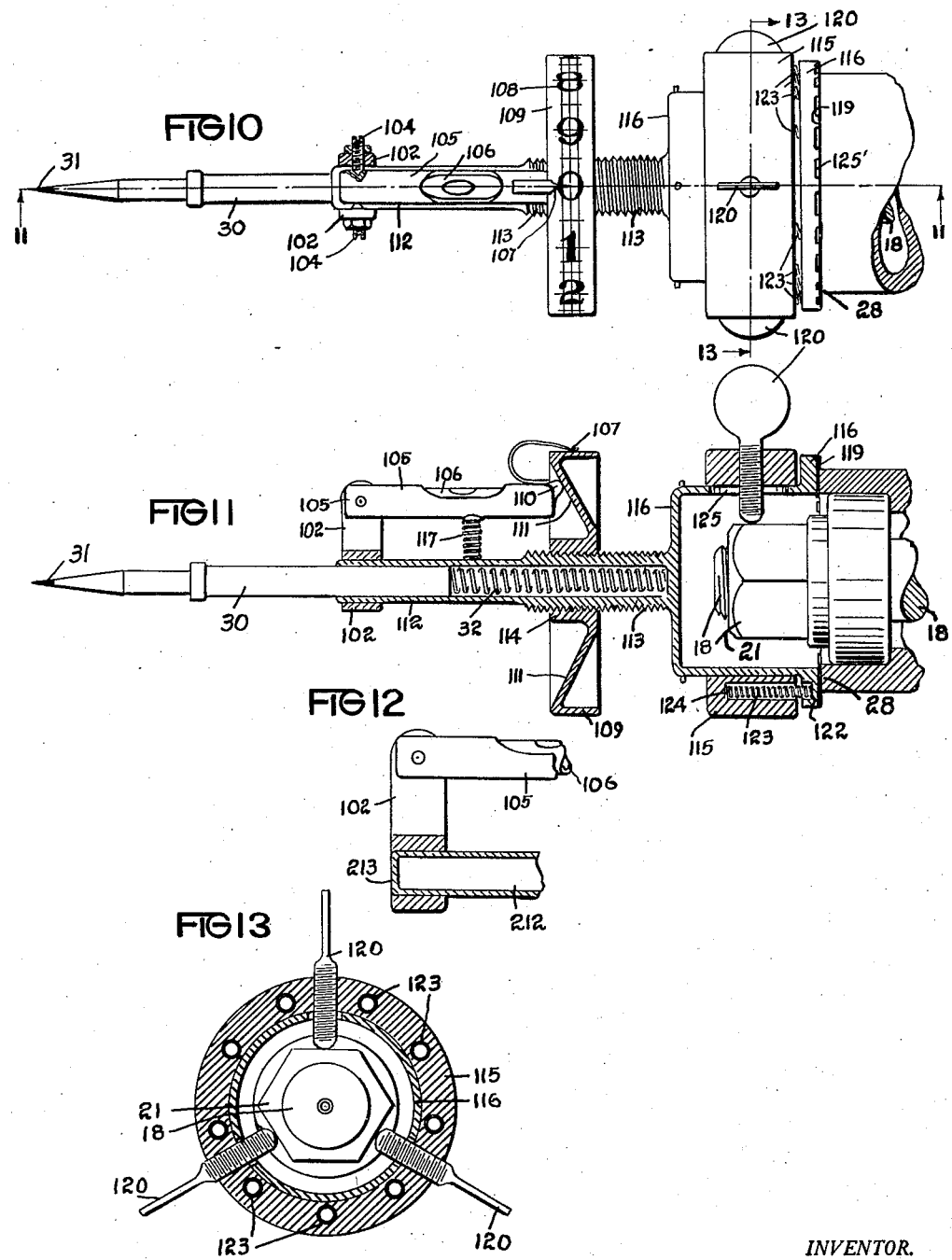
INVENTOR.
BIAGIS CASTIGLIA.
BY Paul A. Talbot.
ATTORNEY.

Patented Mar. 23, 1948

2,438,358

UNITED STATES PATENT OFFICE 2,438,358

WHEEL GAUGE FOR VEHICLES

Biagis Castiglia, New York, N. Y., assignor to Wheel Aligning Necessities, Inc., New York, N. Y., a corporation of New York Application April 21, 1943, Serial No. 483,898

6 Claims. (Cl. 33—203.12)

My invention relates to a gauge for aligning and determining the characteristics of vehicle wheels and particularly for determining the camber, caster, king pin inclination, wheel centers, and parallel tracking, and has among its purposes and objects to provide:

A device which conveniently and accurately shows the characteristics of the wheels of the vehicle so that the inaccuracies may be corrected to increase the life of the tires, the balance and road performance of the vehicle.

A device to facilitate the aligning of vehicle wheels.

A caster and camber gauge combined with a wheel aligning gauge.

A quick, easy way of correcting wheel aligning inaccuracies.

An instrument quickly adjustable to indicate the condition of vehicle wheels.

I accomplish these and other objects by the construction herein set forth and shown in the accompanying drawings forming a part hereof in which:

Fig. 1 is a diagrammatical plan view.

Fig. 2 is an elevation and section of one end of my gauge.

Fig. 3 is a section of the spindle attachment at 3—3, Fig. 4.

Fig. 4 is a fragmentary elevation of the spindle attachment.

Fig. 5 is a fragmentary plan view of the spindle attachment showing the micrometer camber gauge.

Fig. 6 is a fragmentary plan view of one part of the wheel center gauge.

Fig. 7 is a fragmentary elevation of one of the wheel center gauges.

Fig. 8 is a plan view of the base and frame with turntables and caster recorders with the spindle attachments and wheels, not shown.

Fig. 9 is an elevation of one of the caster record holders showing one of the caster record sheets and a part of one of the supporting frames.

Fig. 10 is a plan view of a modification of the spindle attachment.

Fig. 11 is a section at 11—11, Fig. 10.

Fig. 12 is a fragmentary detail of a modification.

Fig. 13 is a section at 13—13, Fig. 10.

Similar reference characters refer to similar parts throughout the several views of the drawings and in the specifications to follow.

I am aware that my gauge may be a combination of several devices for determining several separate and seemingly independent indications and records. These indications, however, are dependent and must all be related to produce a unity of function and result. For instance, the caster, the camber, the king pin inclination, and the wheel centers or parallel tracking of the wheels are all combined to give a passenger automobile the excellence of road performance which cannot be accomplished without their accurate and intended cooperation.

I am aware that there are camber gauges; that there are caster gauges and gauges that independently may be combined, and because they are not dependently combined, they are subject to error, and this error is eliminated by the use of my invention which relates and composes the otherwise separated characteristics of the vehicle wheel and its suspension to the chassis of the vehicle.

The degrees the two wheel spindles travel in turning a corner are not identical and the caster record, combined with the wheel center determination as well as the angle each spindle is moved, are seen at one inspection; the two charts show all of these characteristics at once and in a single operation. This illustration is typical and is pointed out to show the dependence of the parts to each other as contrasted with several separated gauges which are not physically connected to each other. This is not a mere aggregation of independent gauges each capable of producing its independent function; the simultaneous indications of the several gauges produce a new functional relationship and do more than the combining of the indications of several separated gauges.

In this disclosure, the drawing and the detailed description, it is my purpose to illustrate a preferred embodiment of my invention rather than to limit its scope. It is not intended that all possible modifications of this disclosure are set forth, and to those skilled in the art to which this invention pertains, numerous modifications may suggest themselves after a study of this detailed disclosure.

The preciseness of the details is intended to make the construction better understood and thus avoid confusion which might result from a more abstract and generalized description, or a specification made confusing by pointing out numerous modifications which one skilled in the art of wheel aligning may readily see.

Referring to the drawings, I have shown the principal parts as comprising the spindle attachments S, the stationary adjustable frame F, the turn tables T, and the record holders R, and center gauges C.

The spindle attachments S are provided with the micrometer camber gauges M and scriber indicators I. The cooperation of the parts will be better understood after a study of the more detailed description.

The larger detailed views of the drawings show one of a pair, some of which are identical and are disposed at either side of the vehicle while others are identical except that one is right hand and the other left hand; the record sheets, for instance, are right and left while the record holder may serve at either side.

The spindle attachments S comprise the centering and securing members each preferably having the hub facing piece 1 having the level supporting arm 2; one end of which is secured to or formed integral with the piece 1 and the free end is provided with the swing joint 3 carrying the pivot pin 4 on which the level holder 5 is swingingly secured. The level holder is provided with the sensitive level 6 and at its free end swingingly supports the finger pointer 7 which combines with the micrometer indicator 8 of the micrometer drum 9 to indicate the degrees of camber of the wheel.

The level holder 5 is provided with the rider 10 at its free end which rests on the cone 11 secured to the micrometer drum 9 which thus raises and lowers the free end of the level holder as the micrometer drum and cone is moved axially on the caster indicator sleeve 12 which is provided with the threads 13 which engage the threaded hub 14 of the micrometer drum.

The caster indicator sleeve 12 is secured to the spindle centering member 15 by the flange 16 which is provided at its inner center with the center 17 which engages the center in the spindle 18 of the steering knuckle 19. The spindle centering member 15 is preferably provided with the thumb screws 20 radially disposed so that their inner ends may engage the spindle 18 or the spindle nut 21, thereby adjustably securing and centering the caster indicator sleeve 12 to and in relation to the spindle 18.

The centering member is preferably provided with the spring seats 22 which receive the springs 23 the other ends of which engage the spring seats 24 in the facing piece 1. The thumb screws 20 preferably pass freely through the notches 25 in the overlapping flange 26 of the facing piece 1, thus permitting slight freedom of motion between the facing piece 1 and its adjacent centering member 15. Both pieces are accurately machined and surfaced all over so that the finished end surface of the wheel hub 28 is held firmly against the facing piece by the springs 23 and also serve as a guide in adjusting the axial alignment of the caster indicator sleeve 12 when it is centered on the spindle, as any variation in the distance between the adjacent faces of the facing piece 1 and the centering member 15 may be easily detected while adjusting and securing the latter to the spindle.

The micrometer drum, when revolved on the threaded sleeve 12, moves axially in either direction; when moved away from the wheel, the end of the level holder, which rests on the cone 11, is lowered. When the drum and cone are moved toward the wheel, the end of the level holder is raised. The level, when thus adjusted, shows the relation between the axis of the sleeve 12 and the horizontal or between the face of the hub 28 and a vertical plane. The degrees of the camber of the wheel are thus accurately determined by referring to the micrometer indicator 8 which is calibrated to show the degrees or parts of a degree as desired.

The caster of the wheel, the forward or back angle of the steering knuckle, the angle of the wheel when turned, the wheel centers, tracking, and also the inclination of the king pin are determined by referring to the record 27.

The indicator sleeve is preferably provided with the spring actuated marker holder 30 in which is held the marker 31 which may be a pen or pencil held in axial alignment with the spindle 18 by the sleeve 12 in which the marker holder is slidably mounted to move axially by the spring 32 which forces the marker against the record 27, thus scribing on the record the movement of the wheel as it is turned.

When the marker of each of the front wheels is at mid position, such as when the vehicle is being steered straight ahead or back, both right and left side markers should be on the center lines 33 of the records.

When the front wheels 29 and 39 are turned at the extremes of travel as when turning the vehicle, the marker should be on or near one end of the center lines 34 and on the side 29, for instance, the marker will be near the rear edge 35 of the record while the marker on the other side near the wheel 39 will be toward the front edge of the record on that particular side of the vehicle, as shown in broken lines in the diagrammatic view, Fig. 1.

The right and left records, 27 and 37, thus are right and left with regard to the starting point 36. The rear edge 35 and starting point 36 being at the right when looking at the record 27 and at the left when looking at the record 37.

The travel of the marker in degrees indicating the angle of the spindle is shown on the record and the wheel angle at the inside of the turn is greater than the wheel angle at the outside of the turn, thus the line 38 scribed by the marker begins a greater number of degrees from the center line 33 than at the end 40 of the mark or line 38; for instance, the end 40 may be 20 degrees and the beginning 36 may be 24 degrees from the center line 33.

Indicia 41 on the top or bottom of the record, may show accurately the travel in degrees of the spindle and wheel in turning. Indicia 42 at the front edge 43 of the record may show the positive or negative caster accurately in degrees in which the center line 34 is zero, indicating, if the scribed line is along this center line, that there is no caster and also indicating, if the line scribed by the marker ends above the center line 34, that a positive caster exists and also the amount of the positive caster. Likewise, if the line ends below the center line 34, the record shows that negative caster exists as well as the amount accurately in degrees. The caster angle of the axis 44, kingpin 45, on which the wheel swings is not to be confused by the kingpin inclination in which the axis of the kingpin is at an angle to the perpendicular at the right or left of the center of the vehicle while the caster angle is the angle from the perpendicular in relation to the front or back of the vehicle.

It is to be noted that the record holder is curved at a radius from the axis of the kingpin and the marker 31 is substantially at the same height from the floor as the center 17 of the spindle. The record holder is inclined parallel to the kingpin inclination.

If the record holder were perpendicular, the line scribed by the marker would be curved or a part of an ellipse. Thus, if the kingpin inclination is not parallel to record, the record may be adjusted by tilting the record holder R on the pin 46 and the pointer 47 secured to said record holder will give an accurate reading of the kingpin inclination as indicated by the calibrations and indicia 48 preferably disposed on the supports 49 for the record holder R.

Secured to the back of each record holder, I have provided the center gauges C, each having a measuring tape 50 which, in most respects, may be similar to any spring retracted measuring tape such as commonly used for many other purposes. The tape 50 is retracted into the housing 51 which is secured to the record holder and so positioned as to read the distance between the edge 52 of the opening 53 to the center point 54 at the end of the tape. The center point may be inserted into the center of the wheel or to any other point having a like counterpart on the opposite side of the vehicle so that the vehicle may be set accurately on the turntables T which are so disposed and adjusted as to freely rotate on the axis 44 of the kingpin.

The turntables T each may be identical in construction and provided with the center pin 55 securing the turntable to the base frame 56, the roller races 57 of which coact with the roller races 58 of the revolving plate 59 to receive the rollers 60 to reduce friction and to permit the free turning movement of the wheels of the vehicle when centered on the turntable and revolving plate which is facilitated by the pair of adjustable guides 61 so disposed as to suit the width of the tire of the vehicle wheel. Adjustment may be made by the notched ears 62 which receive the bolt 63 preferably suited to engage any of the plurality of tapped holes 64 in the plates 59.

The base frame 56 is preferably provided with diametrically disposed guide arms 65 which are grooved on their under surface to receive either of the record holder bases 66 or the center spreader 67, either of which is slidably and adjustably secured in said arms 65 by the bolts 68 and slots 69 and 70. Thus, the turntables T may be adjusted in relation to each other to suit the wheel gauge of the vehicle or the wheels may be centered or disposed on the turntable to suit the kingpin inclination or the size of the tires of the vehicle wheels. The record holders may be moved away from or toward the wheels.

The record holder supports 49 are preferably adjustably secured to the bases 66 by the risers 71 which are slotted 72 to receive the bolts 73 which are provided with the wing nuts 74, thereby permitting the record holder to be raised or lowered as desired.

While I have shown a chart or record and its holder as a means of indicating the caster angle, as well as other information pertaining to the kingpin and spindle, the caster may also be determined by the micrometer gauge and level and in Fig. 12, I have shown a fragmentary view in which the marker which also serves as an indicator, is eliminated. The micrometer means of indicating by means of a level is substituted for the record.

The operation of a level and spindle attachment for determining the caster is in many respects similar to determining the caster angle on the record. The wheels and spindles are turned to one extreme of travel at which position the level is set by revolving the micrometer drum on its threaded center or sleeve until level. The position on the indicia of the drum is noted; the wheels and spindles are then turned a like number of degrees on the other side of the center position and the level again adjusted and indicia on the micrometer drum will, when so calibrated, give the caster angle. The caster angle is determined by noting the difference between the first and second reading of the micrometer drum.

The lack of caster may also be determined by the fact that there is no change in the two readings and the direction of movement of the micrometer drum designates a positive caster or a negative caster.

The modification of the spindle attachment shown in Figs. 10, 11, and 13, operates in much the same manner as the construction shown in Figs. 2, 3, 4 and 5. The principal difference is in the adjustment of the attachment to align the parts to the spindle and wheel hub. The internal tapered surface of the micrometer drum also is substituted for the conical surface in adjusting the level for either camber or caster angle determination.

In Figs. 10, 11, and 13 of the drawings, the marker 31 or indicator I is held in the marker holder 30 which is forced out of the sleeve 112 in which it is slidable axially by the spring 32.

The sleeve 112 is provided with the enlarged floating cupped end 116, the end surface 119 of which is pressed firmly against the faced end 28 of the wheel hub. The face 119 is preferably provided with relieved segments 125' to insure a better seat and to catch particles of dirt when oscillated. The face 119 of the cupped end 116 is forced against the end 28 of the hub by the springs 123 one end of which rests in the spring seats 122 of the cupped end 116 and the other ends in the spring seats 124 of the member 115 which is slidably mounted on the exterior of the cupped end 116 and provided with the thumb screws 120 which pass through the slots 125 in the cupped end and engage the spindle nut 21 of the spindle 18, thereby firmly holding the member 115 on the spindle and permitting the springs 123 to force the cupped end firmly against the end of the hub of the wheel.

The sleeve 112 is provided with the threads 113 which receive the threaded hub 114 of the micrometer drum 109, which is provided with the indicia 108 which may be calibrated to show degrees of angularity of the level 106 which is held in the swingingly mounted level holder 105 by the center pointed adjusting screws 104 of the bracket 102.

The free end of the level holder is provided with the yieldingly mounted pointer 107 and the rider 110 which rests against the conical surface 111 within the micrometer drum 109. The rider 110 is forced to contact the tapered surface within the drum by the spring 117.

As the micrometer drum is revolved on the threaded sleeve, the free end of the level holder is raised or lowered and the indicia on the surface of the drum is calibrated to give the desired reading in degrees to show the camber or caster or both camber and caster, as well as the setting of the marker in relation to the record.

In Fig. 12, the sleeve 212 is similar to the sleeve 12 or 112 except that the marker and its holder are not provided. The end 213 is closed near the bracket 102.

Having thus described the preferred embodiment of my invention as illustrated in the drawings, what I claim as new and desire to secure by Letters Patent is:

1. In a vehicle wheel gauge having wheel centering means for the front wheels of the vehicle and turntables and supporting means therefor connected to each other supporting the wheels and permitting the wheels to be turned as when steering the vehicle, a record supporting means secured to said turntable supporting means and a marker secured to and swinging with the wheel, said record supporting means being curved cylindrically to conform to the arc swept by the end of said marker, whereby the marker contacts the face of the record on said record holding means.

2. In a vehicle wheel gauge, for determining wheel mounting characteristics, having a turntable on which the wheel to be aligned may be swung as in steering the vehicle, means rotatably supporting the turntable, a record holding means secured to said turntable supporting means in fixed relation thereto, and means swung with the wheel contacting the face of the record on said record holding means and indicating thereon the swinging movement of the wheel, the face of said record holding means being cylindrically curved to substantially conform to the path traveled by said indicating means and also to indicate any vertical travel of said indicating means.

3. In a vehicle wheel gauge, for determining wheel mounting characteristics, having a turntable on which the wheel to be aligned may be swung as in steering the vehicle, means rotatably supporting the turntable, a record holding means secured to said turntable supporting means in fixed relation thereto, and means swung with the wheel contacting the face of the record on said record holding means and indicating thereon the swinging movement of the wheel, the face of said record holding means being cylindrically curved to substantially conform to the path traveled by said indicating means and also to indicate any vertical travel of said indicating means, adjusting means for said record holding means to adjust the face of said record holding means to bring it into parallelism with the inclination of the kingpin on which said wheel swings.

4. In a vehicle wheel gauge having marker means secured to the spindle of the wheel and swung with the wheel, record holding means having a record with its face held to parallelism with the axis on which the wheel is swung and said record having lines and indicia representing no caster and the relative degree of both positive and negative caster, the caster being determined by swinging the wheel and said marker means with the latter contacting said record.

5. In a vehicle wheel gauge having marker means secured to the spindle of the wheel and swung with the wheel, record holding means having a record with its face held to parallelism with the axle on which the wheel is swung and having lines and indicia whereby the center position and the angle of travel of the wheel in either direction from the center position is indicated, said marker means contacting the face of said record.

6. In a vehicle wheel gauge having marker means secured to the spindle of the wheel and swung with the wheel, record holding means having a record with its face held toward the axis on which the wheel is swung and having lines and indicia on a record held by said record holding means, said record holding means and said record being curved to conform with the arc of travel of the end of the marker, adjustable supporting means for the record holding means to position said record holding means and also hold said record holding means in parallelism with the axis on which the wheel is swung whereby the kingpin inclination may be determined.

BIAGIS CASTIGLIA.

REFERENCES CITED

The following references are of record in the file of this patent:

UNITED STATES PATENTS

| Number | Name | Date |
|---|---|---|
| 1,927,488 | Christensen et al. | Sept. 19, 1933 |
| 2,133,827 | Miller | Oct. 18, 1938 |
| 2,160,226 | Phillips | May 30, 1939 |